Patented Oct. 24, 1933

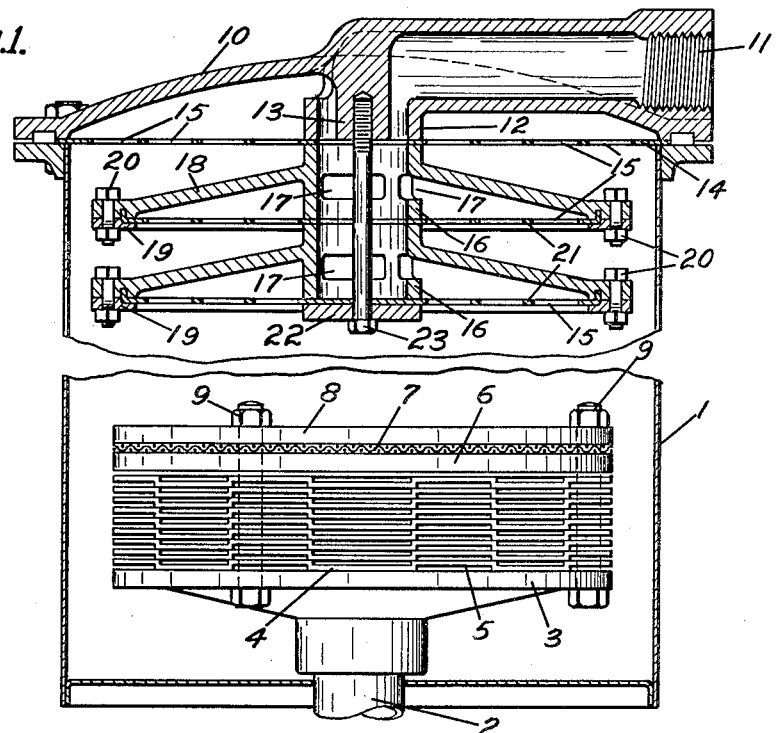
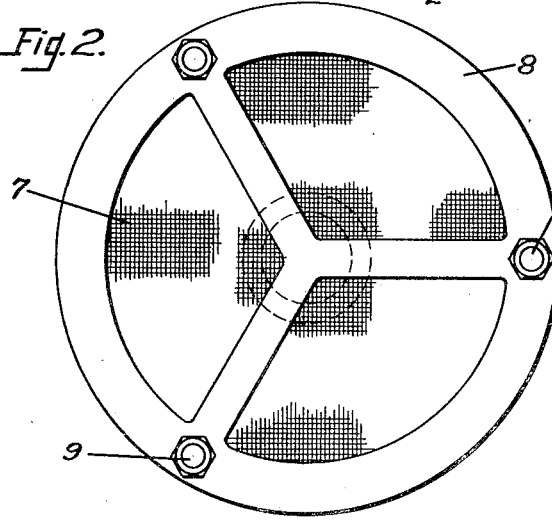
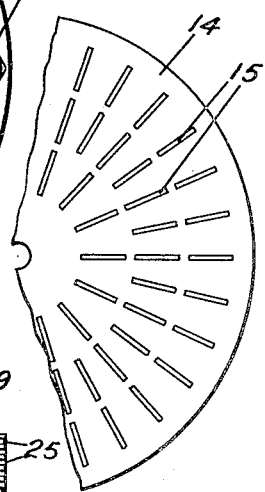
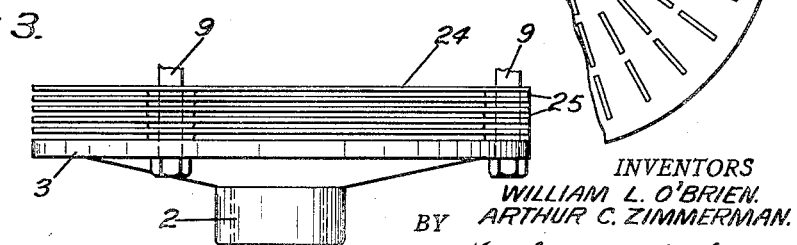

1,932,117

UNITED STATES PATENT OFFICE 1,932,117

TANK FOR WATER SOFTENERS

William L. O'Brien and Arthur C. Zimmerman, Dayton, Ohio, assignors to The Duro Company, Dayton, Ohio, a corporation of Ohio Application April 6, 1931. Serial No. 527,933

7 Claims. (Cl. 210—24)

This invention relates to improvements in tanks for water softeners, and has for its object to provide, in connection with a water softening tank, strainer means for properly straining the water passing through the tank.

It is particularly the object of this invention to provide, in connection with a water softening tank, a plurality of discs so formed and so positioned that a minute space is provided between them through which the water to be strained is passed.

It is also an object of this invention to provide, in connection with a nest of discs with minute spaces between them, strainers also cooperating with the discs for straining the water.

It is also an object of this invention to provide, in connection with a water softening tank, a plurality of softening means so that if one should become clogged the others are open and the water can freely pass through the tank from the inlet, out through the outlet.

These and other advantages will appear from the following description taken in connection with the drawing.

Referring to the drawing:

In Figure 1 there is shown a vertical fragmentary section through a tank, showing the improved strainer means mounted therein.

Figure 2 is a top plan view of the strainer shown in the lower end of Figure 1.

Figure 3 is a section of a slightly modified form of strainer structure.

Figure 4 is a fragmentary plan view of the strainer plate.

The tank in which the strainer mechanism is located is indicated by the numeral 1, and has an inlet pipe 2 leading into the bottom of the tank. On the upper end of this inlet pipe and within the tank is a head 3, which has supported on top thereof a plurality of strainer rings 4. These strainer rings are annular in shape and made of flat plate material, and have offset parts 5, as shown in the lower end of Figure 1. These offset parts are adapted to alternately rest one upon the other in placing one strainer ring on top of the other for forming a nest of these rings.

Resting on top of a nest of these rings, as shown in the lower part of Figure 1, is a ring 6, upon which is a net or strainer 7 extending entirely across the whole upper structure of the nest of discs. Upon the net or strainer is a second and upper ring 8. These rings, discs and the net or strainer are held to the head by means of bolts 9.

When the water enters through the inlet 2 it passes into a chamber formed within the annular rings, and from this chamber it passes through the minute spaces between the rings, and also through the spaces formed in the net. By this means the water from inlet pipe 2 passes into the tank. The tank has a cover 10, which has an outlet 11 therein. Extending from the central part of the cover downwardly in the direction of the tank is a sleeve 12 forming part of an outlet passageway from the tank into the outlet 11. Within this sleeve and projecting from the cover is a boss 13, around which the water passes in going through the sleeve 12 into the outlet.

Between the upper end of the tank and the cover is a strainer disc 14. This disc has a multitude of very fine slits 15 so that the water in passing through these slits will be thoroughly strained. Attached to the cover is a second strainer member having a sleeve 16 of the same general shape as sleeve 12. This sleeve has lateral openings 17 by which the water enters into the sleeve so that it may pass from this sleeve, through sleeve 12, into the outlet.

Extending from this sleeve 16 is a downwardly extending dish-shaped disc member 18 which has attached to its outer periphery, on the under side thereof, a ring 19 by means of screws or bolts 20. Between this disc 18 and ring 19 is a strainer disc 21 of the same nature and character as disc 14. This disc, sleeve and strainer forming a receiving chamber are supported on the sleeve 12 by means of a screw 23, which extends into the boss 13. By making this screw 23 longer two or more of these sleeves and discs may be supported on the sleeve 12 so that we may have a plurality of straining discs 21. Cooperating with the screw is a washer 22. The water as it passes upwardly will pass through one disc 21 or the disc 14 and through the openings or holes 17, and out through the outlet 11.

If any one strainer should become clogged, thereby prohibiting the water from passing through it, the water will pass around this strainer and through the next one and out through the outlet. By this means the straining of the water is assured and at the same time an ample and abundant flow of water is assured, whereas if one strainer were depended upon it would become clogged, the flow of water would be checked and the use of the apparatus materially lessened, but by having a plurality of strainers supported in the manner shown by a screw 23, a constant supply of water may be furnished that is thoroughly strained.

In addition to having the form of disc shown in Figure 1, a plain disc or ring 24 may be provided, as shown in Figure 3. In this form the discs are separated by minute spacer washers 25. The spaces between these strainer rings are exaggerated for the purpose of illustration and clearness, but as a matter of fact, they are close together so that the water passing through them is thoroughly strained.

In operation the water passes in through the inlet pipe 2 and through the strainer rings and strainer located on the upper end thereof. Here the initial straining takes place. The water in leaving the tank passes through one or more strainer means, located on the upper end or top of the tank by means of the screw 23. In case one strainer becomes clogged the water passes around it to the next one, or in case the next higher one is clogged the water passes to a still higher one, and ultimately out through the outlet 11.

We desire to comprehend within our invention such modifications as may be embraced within our claims and the scope of our invention.

Having thus fully described our invention, what we claim as new and desire to secure by Letters Patent, is:

1. In a water softener, a tank having an inlet pipe, an annular head on the pipe, a plurality of superimposed flat rings, each ring having on opposite faces a plurality of radially and alternately arranged rectangular corrugations therein, whereby each two adjacent rings have narrow openings therebetween.

2. In a water softener tank having an inlet and an outlet, a strainer inclosing the inlet, said strainer comprising a plurality of superimposed flat slightly corrugated rings, and a strainer for the outlet comprising a plurality of discs having narrow slits therein and a cone-shaped support and a water guide for each disc.

3. In a water softener tank having an inlet and a strainer for the inlet comprising a plurality of superimposed flat rings and a net across the top of the rings, said rings being slightly corrugated to provide a plurality of narrow slots between two adjacent rings.

4. In a water softener tank having an inlet, a cover therefor having an outlet, a plurality of strainer units on the cover consisting of a sleeve with a dish-shaped disc thereon and a strainer on the disc and adapted to strain water and direct it into the outlet, and a strainer and distributor on the inlet comprising a plurality of corrugated ring plates.

5. In a water softener tank having an inlet, a cover therefor having an outlet, a plurality of strainer units on the cover adapted to strain water and direct it into the outlet, a strainer and distributor on the inlet comprising a plurality of corrugated ring plates, and a foraminous disc.

6. In a water softener tank having an inlet and an outlet, a plurality of strainer units, each unit straining a part of the water and directing it into the outlet, and a strainer and distributor on the inlet comprising a plurality of corrugated annular plates and a foraminous disc over the plates.

7. In a water softener tank, a strainer in said tank, said strainer comprising a plurality of superimposed flat slightly corrugated rings, a screen on one side of said rings, and a head on the other side of said rings and a pipe leading from the head to the outside of the tank.

WILLIAM L. O'BRIEN.
ARTHUR C. ZIMMERMAN.